United States Patent [19]
De Luca et al.

[11] 3,947,730
[45] Mar. 30, 1976

[54] TELEPHONE LINE SURGE PROTECTING DEVICE

[75] Inventors: Paul V. De Luca, Syosset; William V. Carney, Valley Stream; Michael Fasano, South Floral Park, all of N.Y.

[73] Assignee: Porta Systems Corporation, Syosset, N.Y.

[22] Filed: July 22, 1974

[21] Appl. No.: 490,553

[52] U.S. Cl. ................. 317/61.5; 317/62; 337/28; 337/34
[51] Int. Cl.² .................... H02H 3/22; H02H 7/20
[58] Field of Search ....... 317/16, 61.5, 62; 179/184; 337/15, 28, 31, 32, 33, 34, 148, 273, 282, 196; 339/36, 91, 128, 147 P; 174/52 R; 307/93

[56] References Cited
UNITED STATES PATENTS

| | | | |
|---|---|---|---|
| 3,274,361 | 9/1966 | Ebensteiner et al. | 337/180 |
| 3,285,548 | 11/1966 | Matto et al. | 339/128 |
| 3,286,255 | 11/1966 | Sanchez | 339/128 |
| 3,535,779 | 10/1970 | Wanaselja | 337/32 |
| 3,543,207 | 11/1970 | Kawiecki | 337/28 |
| 3,587,021 | 6/1971 | Baumbach | 337/32 |
| 3,699,500 | 10/1972 | Borzoni et al. | 337/196 X |
| 3,849,750 | 11/1974 | Baumbach et al. | 337/32 |

Primary Examiner—J. D. Miller
Assistant Examiner—Patrick R. Salce
Attorney, Agent, or Firm—Charles E. Temko

[57] ABSTRACT

A line voltage surge protecting device for telephone systems which normally include means for grounding excessive currents caused by lightening and the like. The device includes a gaseous discharge element which becomes conductive when the voltage in the line being protected momentarily exceeds a predetermined value to conduct current to a source of ground potential. A temperature sensitive element responsive to heat generated by the gaseous discharge device during prolonged excessive current serves to short the gaseous discharge element to ground. The temperature sensitive element includes means resiliently biasing the gaseous element for movement serving to short the same. A soldered retaining means opposes such movement, and heat developed in the gaseous discharge device is transmitted to the soldered means by conduction to melt the solder to permit the shorting action to occur. The protective structure is disposed in a casing element having improved cover means facilitating accessibility for repair and resetting of the soldered means.

1 Claim, 7 Drawing Figures

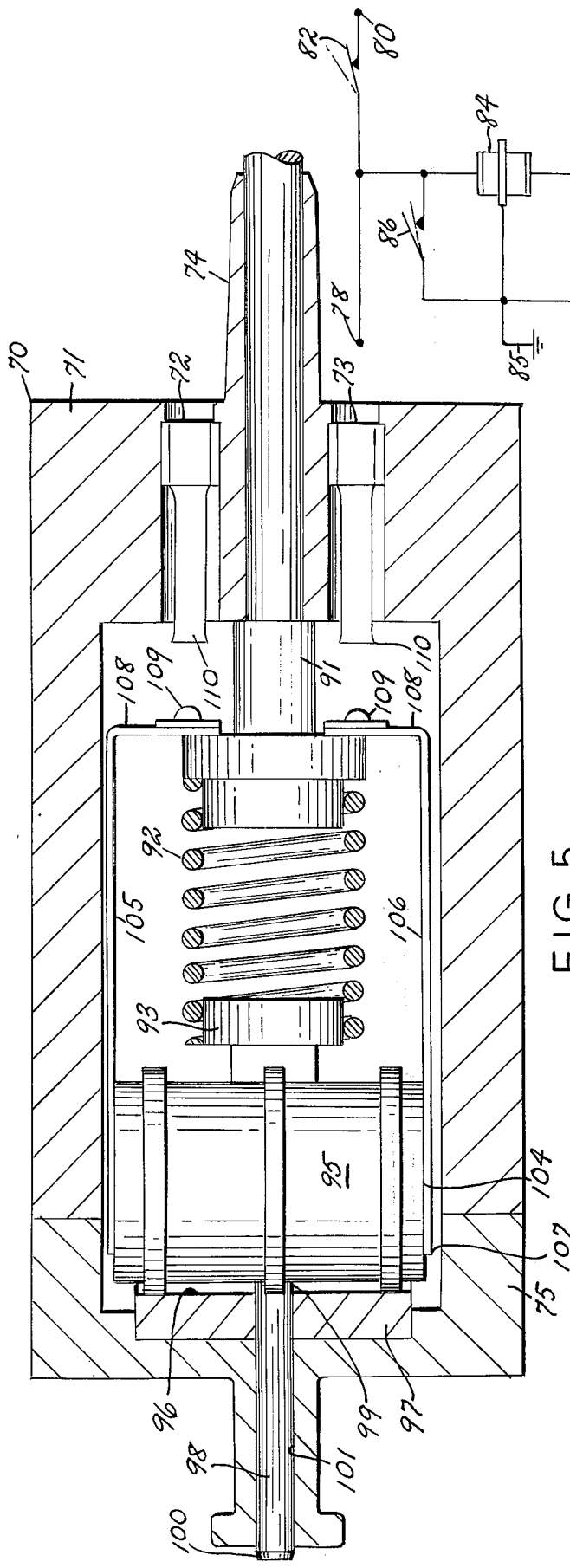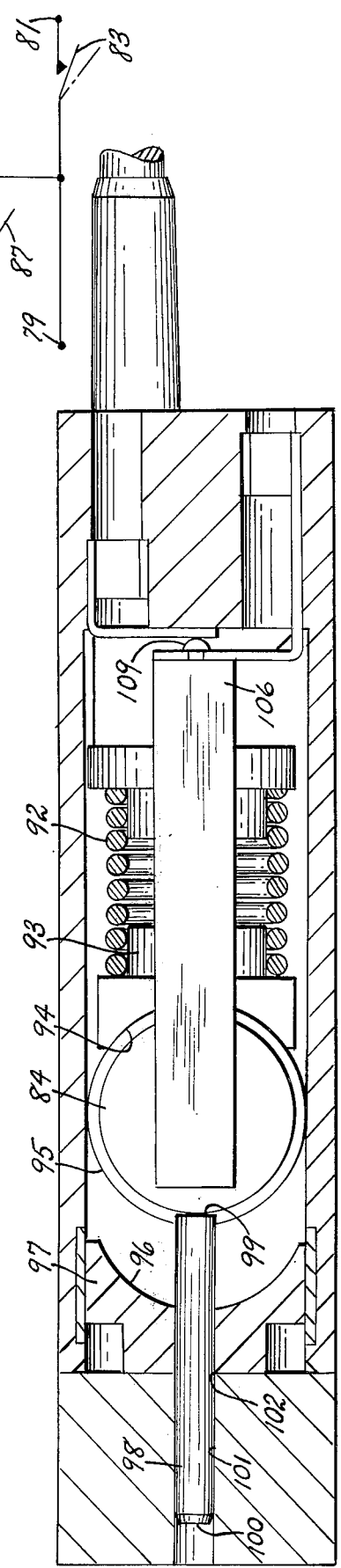

TELEPHONE LINE SURGE PROTECTING DEVICE

BACKGROUND OF THE INVENTION

In the co-pending application of Paul V. DeLuca, Ser. No. 395,386 filed Sept. 10, 1973, and assigned to the same assignee as the instant application, there is disclosed a line surge protecting device operating in an analogous fashion, the present invention lying in specific constructional details permitting facility in repair and simplification in construction.

SUMMARY OF THE INVENTION

Briefly stated, the invention contemplates the provision of a device of the class described in which heat developed in the gaseous discharge device is directly conducted to the soldered retaining means without the use of a resistive heat coil for faster operation. A casing element having a detachable cover is provided, the removal of which requires a tool to release internally disposed latching means maintaining the cover in engaged condition.

BRIEF DESCRIPTION OF THE DRAWINGS

In the drawings, to which reference will be made in the specification, similar reference characters have been employed to designate corresponding parts throughout the several views.

FIG. 5 is a longitudinal central sectional view of a second embodiment of the invention, as seen from the plane 5—5 in FIG. 6.

FIG. 6 is a central sectional view of the second embodiment, as seen from the plane 6—6 in FIG. 5.

FIG. 7 is a schematic electrical wiring diagram showing the interconnection of the second embodiment in a telephone line system.

DETAILED DESCRIPTION OF THE DISCLOSED EMBODIMENTS

Figure 1:
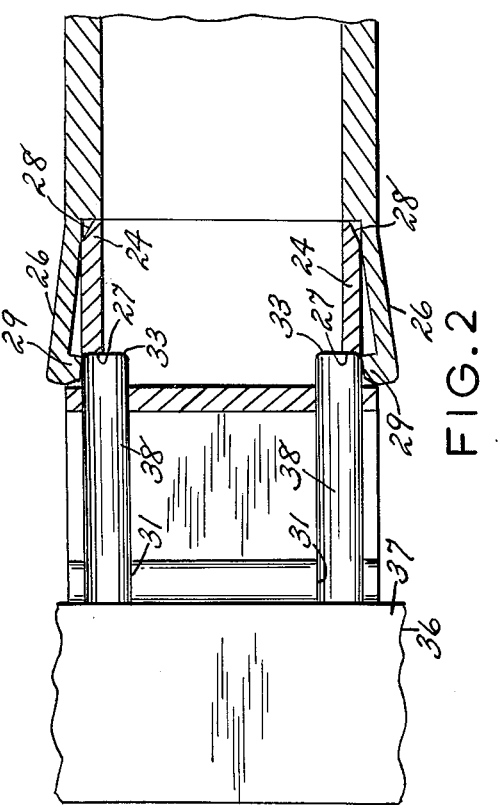
FIG. 1 is a view in elevation of a first embodiment of the invention.

In accordance with the first embodiment of the invention, the device, generally indicated by reference character 10, comprises broadly: a housing or casing element 11, a grounding prong element 12, circuit connecting means 13 and temperature sensitive current grounding means 14.

Figure 2:
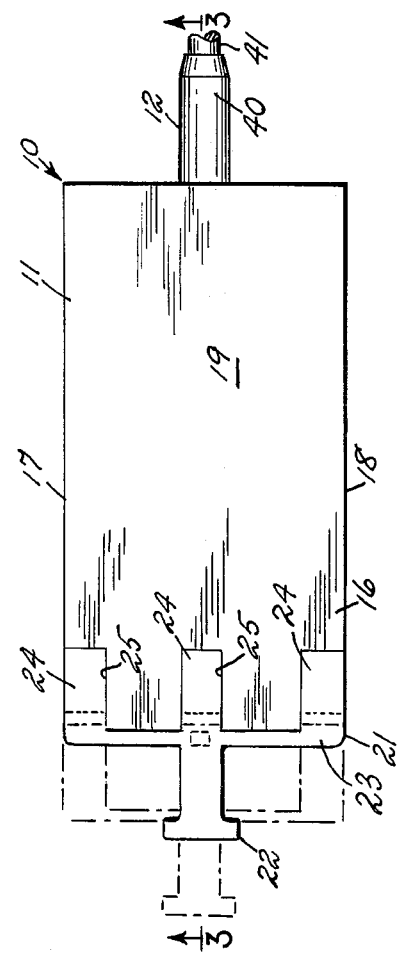
FIG. 2 is an enlarged fragmentary sectional view of the first embodiment, partially in elevation and showing the opening of a casing element thereof by removal of an end cap.

The casing element 11 is preferably formed from synthetic resinous materials, and includes a main body 16 bounded by side walls 17 and 18, an upper wall 19, and a lower wall 20. A separable cover 21 includes a manually engageable grip 22 extending longitudinally from an oppositely disposed end wall 23. A plurality of flange members 24 interfit with a corresponding plurality of interstices 25 on the main body, as best seen in FIG. 1, and the cover 21 is maintained on the main body 16 by the engagement of flexible tabs 26 on the body within corresponding openings 27 on the centrally disposed flange members 24 (see FIG. 2). The tabs 26 are cammed outwardly as shown in FIG. 2 by cam surfaces 28 on the cover, and detent portions 29 engage openings 27 when the cover is fully seated. The wall 23 is provided with openings 31 which permit the intentional and authorized removal of the cover 21 with respect to the body 16 for repair. This is accomplished by a tool element 36 having a body 37 from which extend a plurality of longitudinally projecting members 38. These members are inserted into the openings 31 and are provided with camming surfaces 33 also capable of spreading the flange members on the body as shown in FIG. 2, permitting the cover and tool element to be withdrawn simultaneously. Since the detent means which maintains the cover in association with the body are otherwise inaccessible, unauthorized opening of the device without damage is virtually impossible.

The grounding prong element 12 is generally similar in construction to that in the above mentioned co-pending application, including a supporting sleeve 40 surrounding a metallic prong 41 which extends rearwardly to contact a metallic plate 42 forming part of the circuit connecting means 13.

The circuit connecting means 13 includes a pair of tip contacts 44 and 45, as well as a pair of ring contacts 46 and 47, as is well known in the art. A conductive strip 48 connects the contact 47 to the winding of a heat coil 49, and current is connected back through the heat coil spring 50. A similar duplication of structure, not shown, interconnects the tip contacts 44 and 45.

Figure 3:
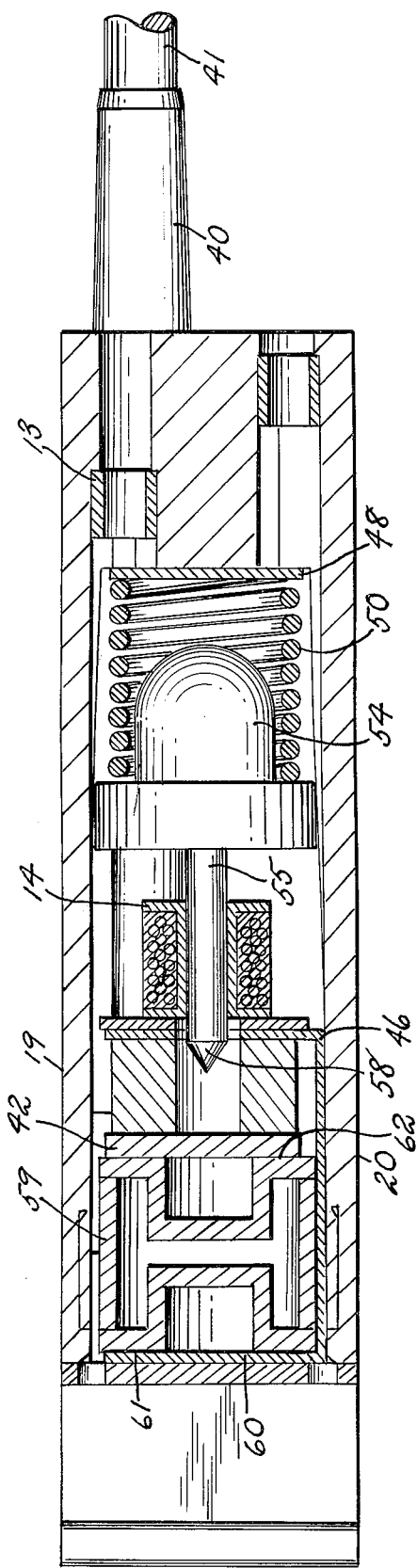
FIG. 3 is a longitudinal central sectional view of the first embodiment.
Figure 4:
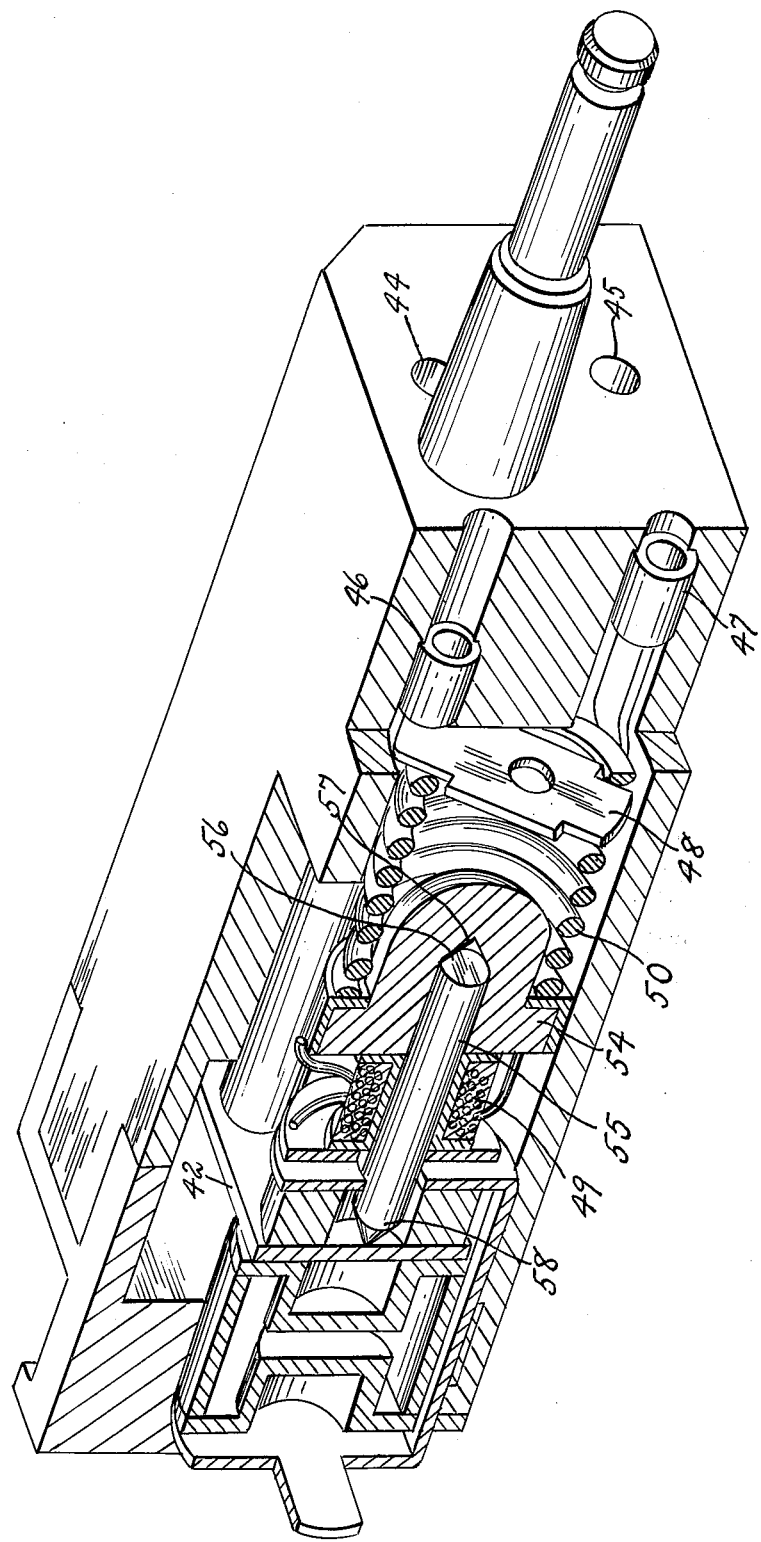
FIG. 4 is a view in perspective, partially in section of the first embodiment.

The grounding means 14 are two in number, only one being illustrated in FIGS. 3 and 4. Each includes the above mentioned spring 50 which acts upon a spring follower 54 supporting a centrally positioned contact member 55. The inner end 56 thereof is positioned in a socket 57 in the follower 54. The outer end 58 is pointed and adapted when the circuit grounding means 14 is actuated to make contact with the plate 42 whereby at least one circuit is grounded to the prong element 12. This position is illustrated in FIG. 4.

Momentary fluctuations in current will not normally actuate the temperature sensitive grounding means 14, and such surges are accommodated by the gaseous discharge device 59 in well known manner. Current in this case flows from the contact 46 to member 60, to the surface 61 of the gaseous discharge device, and from the surface 62 to the plate 42 and thence to ground. Once actuated, the gaseous discharge device is bypassed, and the current flows directly to ground, again as disclosed in the above mentioned co-pending application.

It will be observed that removal of the cover 21 permits all of the above described structure to be removed from the body for servicing and/or replacement, without the use of special tools, other than the above described tool element 36.

Turning now to the second embodiment of the invention, illustrated in FIGS. 5, 6 and 7, the device, generally indicated by reference character 70 includes a casing element 71 generally similar to that in the first embodiment, a plurality of input terminals, one of which is indicated by reference character 72, a plurality of output terminals 73, a grounding prong element 74 and a cover 75 engaged and disengaged with respect to the casing element 71 as in the first embodiment. The second embodiment differs from the first embodiment principally in structure which permit not only the shunting of excess current surges to ground, but the actual opening of the telephone circuits upon the occurrence of a sustained overload. Referring to FIG. 7, there is illustrated a schematic diagram showing the operation of the second embodiment.

As in the first embodiment, the device is adapted to bridge a pair of inputs 78 and 79 and a pair of outputs 80 and 81. Unlike prior art devices, by the use of the second embodiment 70, there are provided a pair of switches 82 and 83 which upon the occurrence of sustained overloads open to protect the output circuits 80 and 81 until the device is either reset or replaced. The device 70 incorporates a known and recently developed three element gaseous discharge tube 84 which at all times communicates with the grounding prong element 85, and which as a result of relative motion between it and the casing element closes switches 86 and 87 upon the occurrence of sustained overload to permit the gaseous discharge device to be discharged to ground.

Referring to FIGS. 5 and 6, there is illustrated the structure corresponding to FIG. 7. A fixed spring anchor 91 is mounted on a wall of the cavity formed in the casing element 71, the same mounting a coil spring 92 supporting on an opposite end a movable follower 93. The outer surface 94 of the follower is curved and corresponds in configuration to the outer surface 95 of the gaseous discharge device 84. In the position shown in FIG. 5, the device 84 contacts the curved surface 96 of a stop member 97 which forms part of the grounding prong element 85. Prior to activation, the device 84 is maintained in the position shown in FIG. 6 against the tension of the spring 92 by a thermally conductive stop rod 98, the inner end 99 of which contacts the surface 95, and the outer end 100 of which is disposed within a bore 101 in the member 97. Reference character 102 indicates a point at which the rod 98 is soldered to the surface 96.

The end surfaces 103 and 104 of the device 84 communicate with first and second conductive strips 105 and 106, respectively, at outer ends 107 thereof. The inner ends 108 thereof are inwardly bent and communicate with mounted contacts 109 each of which is adapted to engage the inner ends 110 of the terminals 72 and 73 when the device is in the condition indicated in FIG. 6.

During normal operation, the device will remain in this condition, the engagement of the contacts 106 with the ends 110 providing the equivalent of closing the switches 82 and 83 in FIG. 7. Upon the occurrence of a momentary overload, the device 84 will become ionized, and discharged to ground through the centrally disposed conductor 113 in FIG. 7, in this condition, the switches 86 and 87 being open.

Should a sustained overload occur, the gaseous discharge device 84 will not only ionize, but will become heated, the heat being conducted down the rod 98 to melt the solder at 102, and allow the rod 98 to move outwardly in the bore 101 wherein it projects outwardly of the cover 75 to give a visual indication of the condition of the device 70. This movement moves the device 84 into direct contact with the member 97, and performs the equivalent of closing the switches 86 and 87 and discharging whatever charge remains on the device 84 at that time. As the spring 92 expands and moves the device 84, the strips 105 and 106 move with the device 84, thereby causing the contacts 109 to part contact with the inner ends 110 of the terminals 72 and 73, thereby opening the circuit being protected.

The setting of the device 70, assuming no damage to the device 84 requires only the removal of the cover 75 and the resoldering of the stop rod 98 to its original position shown in FIG. 6, following which the cover 75 is replaced in engagement with the casing element 71.

It is to be understood that it is not considered that the invention is limited to the specific details of structure shown and described herein, for obvious modifications will occur to those skilled in the art to which the invention pertains.

What is claimed is:

1. An improved telephone line surge protecting device comprising: a casing element defining a cavity, telephone input and output terminals having inner ends communicating with said cavity, a grounding prong element penetrating said casing element and communicating with said cavity, a temperature sensitive element mounted for sliding movement between first and second positions within said cavity, resilient means urging said temperature sensitive element from said first to said second position, temperature sensitive means resisting said resilient means; said temperature sensitive element including a gaseous discharge device and electrically conductive members communicating with said gaseous discharge device substantially at one end thereof, and having second ends communicating with at least one of said input and output terminals when said temperature sensitive element is in said first position; said temperature sensitive element upon moving from said first position to said second position breaking communication of said conductive members with said input and output terminals, and establishing communication between said gaseous discharge device and said grounding prong element.

* * * * *